(12) United States Patent
Cha et al.

(10) Patent No.: US 12,437,144 B2
(45) Date of Patent: Oct. 7, 2025

(54) CONTENT RECOMMENDATION METHOD AND USER TERMINAL

(71) Applicant: KAKAO CORP., Jeju-si (KR)

(72) Inventors: Su Hyeok Cha, Seongnam-si (KR); Tae Heon Lee, Seongnam-si (KR); Hee Young Lee, Seongnam-si (KR); Bo Kyung Kim, Seongnam-si (KR); Gi Hyouk Lee, Seongnam-si (KR); Won Jae Lee, Seongnam-si (KR); Yang Kyun Park, Seongnam-si (KR); Hui Hyeon Kim, Seongnam-si (KR); Hye Won Jeong, Seongnam-si (KR); Ji Sun Park, Seongnam-si (KR); Won Bom Hong, Seongnam-si (KR); Jee Min Yang, Seongnam-si (KR); Hee Jin Lim, Seongnam-si (KR); Ji Hyun Son, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 304 days.

(21) Appl. No.: 17/559,283

(22) Filed: Dec. 22, 2021

(65) Prior Publication Data

US 2022/0198125 A1 Jun. 23, 2022

(30) Foreign Application Priority Data

Dec. 22, 2020 (KR) ........................ 10-2020-0181372

(51) Int. Cl.
*G06F 40/109* (2020.01)
*G06F 16/903* (2019.01)
(Continued)

(52) U.S. Cl.
CPC .......... *G06F 40/109* (2020.01); *G06F 40/279* (2020.01); *H04L 51/046* (2013.01)

(58) Field of Classification Search
CPC ...... G06F 40/109; G06F 40/279; G06F 40/30; G06F 40/106; G06F 16/903;
(Continued)

(56) References Cited

U.S. PATENT DOCUMENTS 11,307,763 B2    4/2022    Moore et al.
2010/0123724 A1    5/2010    Moore et al.
(Continued)

FOREIGN PATENT DOCUMENTS

JP    2008-527563 A    7/2008
JP    2012-509641 A    4/2012
(Continued)

*Primary Examiner* — Hai Phan
*Assistant Examiner* — Ian Scott McLean
(74) *Attorney, Agent, or Firm* — NKL LAW; Jae Youn Kim

(57) ABSTRACT

Provided is a content recommendation method. The content recommendation method includes: receiving, by a user terminal, text information from a user through a text input window of a chatting room, outputting, by the user terminal, a first content set including at least a part of contents related to keyword information to be mapped to the text information, outputting, by the user terminal, a first preview content for a first content included in the first content set, receiving, by the user terminal, an interaction from the user, and in response to the interaction, outputting, by the user terminal, a second preview content for a second content to replace the first preview content, wherein the second content is a content related to the keyword information.

20 Claims, 16 Drawing Sheets

(51) Int. Cl.
   *G06F 40/106*   (2020.01)
   *G06F 40/279*   (2020.01)
   *G06F 40/30*    (2020.01)
   *G06Q 50/10*    (2012.01)
   *G06Q 50/50*    (2024.01)
   *H04L 51/04*    (2022.01)
   *H04L 51/046*   (2022.01)
   *H04L 51/10*    (2022.01)

(58) Field of Classification Search
   CPC ....... H04L 51/046; H04L 51/10; H04L 51/04; G06Q 50/30; G06Q 30/0631; G06Q 50/10
   See application file for complete search history.

(56) References Cited

U.S. PATENT DOCUMENTS

| | | | |
|---|---|---|---|
| 2014/0143265 A1 | 5/2014 | Kim et al. | |
| 2019/0251152 A1* | 8/2019 | Leydon | G06F 40/30 |
| 2021/0326390 A1* | 10/2021 | Aher | G06F 40/30 |
| 2021/0374342 A1* | 12/2021 | Kim | G06F 16/903 |

FOREIGN PATENT DOCUMENTS

| | | | |
|---|---|---|---|
| JP | 2014-170397 A | 9/2014 | |
| KR | 10-1740274 A | 9/2016 | |
| KR | 20160112260 A | 9/2016 | |
| KR | 2018-0080986 A | 7/2018 | |
| KR | 2020-0021648 A | 3/2020 | |
| WO | 2019/203494 A1 | 10/2019 | |

* cited by examiner

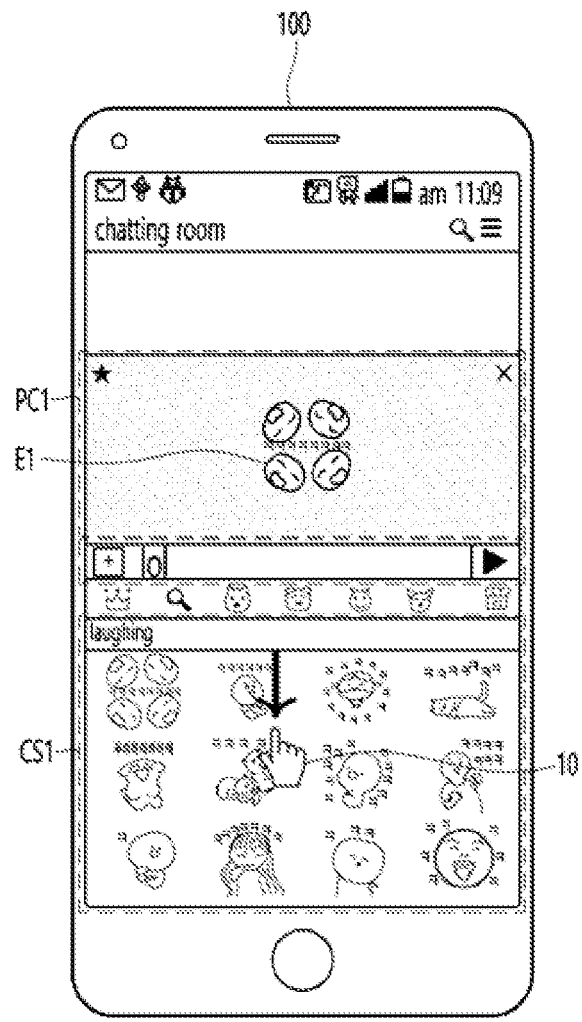 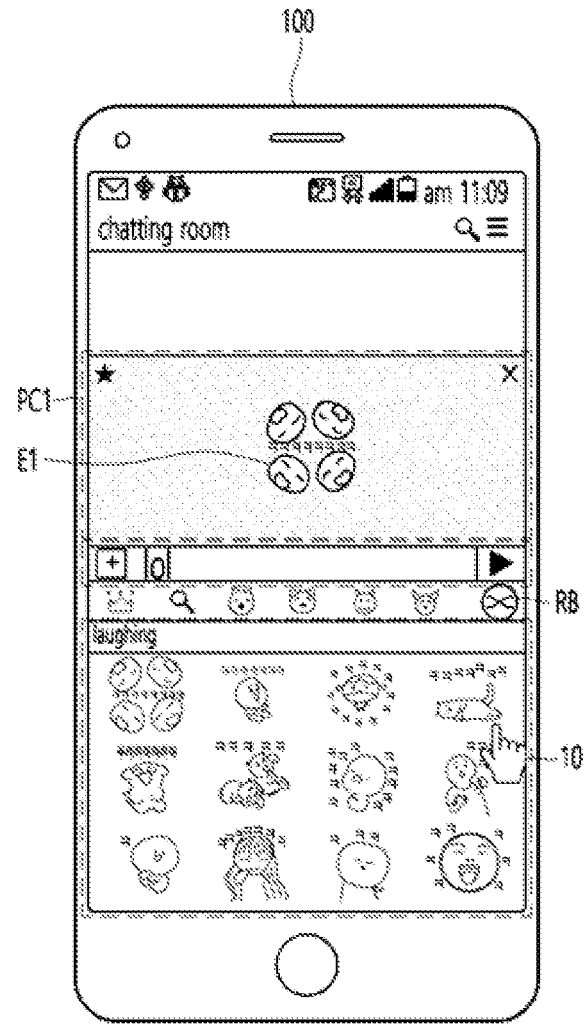
FIG. 7A  FIG. 7B

CONTENT RECOMMENDATION METHOD AND USER TERMINAL

CROSS-REFERENCE TO RELATED APPLICATION

This application claims priority to and the benefit of Korean Patent of Application No. 10-2020-0181372, filed on Dec. 22, 2020, the disclosure of which is incorporated herein by reference in its entirety.

BACKGROUND OF THE DISCLOSURE

Field of the Disclosure

The present disclosure relates to a content recommendation method and a user terminal.

Related Art

In general, an emoticon, which is a pictogram, is a compound word of two words, emotion and icon. This emoticon is a unique expression on the Internet to express various types of emotion, specific characters, jobs, and the like by appropriately combining letters, symbols, and numbers in a computer keyboard.

In recent years, with the development of technology, messages (i.e., Multimedia Message Service (MMS)) including high-resolution images have become more available on mobile devices and diverse message applications executable in a mobile device have been used.

However, emoticons in the form of images or animations are provided simply in the form of list, which makes a user to scroll and select a desired emoticon on a page. Even if the user enters an application store to purchase an emoticon, it is cumbersome to find an emoticon with a facial expression or emotional expression that the user wants because emoticons are listed on the basis of character.

SUMMARY

The present disclosure provides a content recommendation method and a content recommendation server for providing a plurality of contents for text information received from a user terminal and preview contents therefor through an instant message service.

In one general aspect, a content recommendation method is provided. The content recommendation method includes: receiving, by a user terminal, text information from a user through a text input window of a chatting room, outputting, by the user terminal, a first content set including at least a part of contents related to keyword information to be mapped to the text information, outputting, by the user terminal, a first preview content for a first content included in a first content set, receiving, by the user terminal, an interaction from the user, and in response to the interaction, outputting, by the user terminal, a second preview content for a second content to replace the first preview content, wherein the second content is a content related to the keyword information.

The content recommendation method may further include selecting, by the user terminal, the keyword information to be mapped to the text information.

The second content may be included in the first content set.

The content recommendation method may further include in response to the interaction, varying, by the user terminal, arrangement of the contents included in the first content set to output the first content set.

In the outputting of the second preview content to replace the first preview content, the user terminal may output a second content set different from the first content set to replace the first content set, and the second content set may include at least a part of the contents related to the keyword information.

The second content may be included in the second content set.

The content recommendation method may further include receiving, by the user terminal, the contents related to the keyword information from a server prior to the receiving of the interaction, selecting, by the user terminal, a part of the contents related to the keyword information as a first content set, and selecting, by the user terminal, another part of the content related to the keyword information as a second content set.

The content recommendation method may further include, when the user terminal outputs more than a predetermined number of contents related to the keyword information received in the receiving of the contents, receiving, by the user terminal, a content related to additional keyword information from the server.

The keyword information may include a first keyword and a second keyword, the first content may be related to the first keyword, and the second content may be related to the second keyword.

The first content set may include a first keyword set related to the first keyword and a second keyword set related to the second keyword, and in the outputting of the first content set, the user terminal may display the first keyword set and the second keyword set distinguishably from each other.

The content recommendation method may further include in response to the interaction, varying, by the user terminal, arrangement of the first keyword set and the second keyword set to output the first keyword set and the second keyword set.

The interaction may be a pull to action for a display region in which the first content set is displayed, or selection of a button provided in the user terminal.

The text input window, the first content set, and the first preview content for the chatting room may be displayed to be overlaid on some regions of the chatting room, and the first preview content may be displayed on a top of the text input window, and the first set of contents is displayed at a bottom of the text input window.

In another general aspect, a computer program stored in a media to implement the above-described method in combination with hardware is provided.

In yet another general aspect, a content recommendation terminal is provided. The content recommendation terminal includes a memory, a processor connected to the memory and configured to execute instructions stored in the memory, an input unit configured to receive information under control of the processor, and an output unit configured to output information under control of the processor. The processor is further configured to control the input unit to receive text information from a user through a text input window of a chatting room, control the output unit to output a first content set including at least a part of contents related to keyword information to be mapped to the text information, control the output unit to output a first preview content for the first content included in the first content set, and control the input unit to receive an interaction from the user. In response to the interaction, the output unit outputs a second preview content for the second content to replace the first preview content, and the second content is a content related to the keyword information.

In yet another general aspect, a content recommendation method is provided. The content recommendation method includes receiving, by a server providing an instant message through a chatting room, keyword information from a user terminal of a user who is participating in the chatting room, providing, by the server, the user terminal with a first content group including at least a part of contents related to the keyword information and a first preview content for the first content included in the first content group, receiving, by the server, interaction information from the user terminal, and in response to the interaction information, providing, by the server, a second preview content for a second content to the user terminal. The second content is a content related to the keyword information.

The second content may be included in the first content group.

The content recommendation method may further include, in response to the interaction information, providing, by the server, the user terminal with a second content group different from the first content group, and the second content group may include at least a part of the contents related to the keyword information.

The second content may be included in the second content group.

The keyword information may include a first keyword and a second keyword, and the first content group may include a first keyword group related to the first keyword and a second keyword group related to the second keyword.

The server may select the first content from at least one content included in the first content group based on at least one of the following: (1) a usage frequency in the user terminal, (2) a usage frequency in a user terminal different from the user terminal, and (3) a server registration date of the content.

In yet another general aspect, a content recommendation server may be provided. The content recommendation server includes a memory and a processor connected to the memory and configured to execute instructions stored in the memory. The processor may be further configured to control to receive keyword information from a user terminal of a user who is participating in a chatting room, control to provide the user terminal with a first content group including at least a part of contents related to the keyword information and a first preview content for the first content included in the first content group, control to receive interaction information from the user terminal, and in response to the interaction information, control to provide the user terminal with a second preview content for a second content, wherein the second content is a content related to the keyword information.

BRIEF DESCRIPTION OF THE DRAWINGS

FIGS. 3 to 10 are diagrams for explaining a first embodiment of the content recommendation method of the present disclosure shown in FIG. 2.

DESCRIPTION OF EXEMPLARY EMBODIMENTS

Hereinafter, embodiments of the present disclosure will be described in detail with reference to the accompanying drawings. In describing the present disclosure, if it is determined that a detailed description of known functions and components associated with the present disclosure unnecessarily obscure the gist of the present disclosure, the detailed description thereof will be omitted. In addition, the terms used henceforth are used to appropriately express the embodiments of the present disclosure and may be altered according to a person of a related field or conventional practice. Therefore, the terms should be defined on the basis of the entire content of this specification.

The terminologies used herein are used just to illustrate a specific exemplary embodiment, but are not intended to limit the present disclosure. The singular forms used herein include plural forms unless the context clearly dictates the contrary It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

Hereinafter, the present disclosure will be described with reference to the accompanying drawings.

Figure 1:
FIG. 1 is a diagram for explaining the concept of a content recommendation method according to an exemplary embodiment of the present disclosure.

FIG. 1 is a diagram for explaining the concept of a content recommendation method according to an exemplary embodiment of the present disclosure.

As shown in FIG. 1, a content recommendation system according to an exemplary embodiment of the present disclosure may include a user terminal 100 and a messenger server 200.

The user terminal 100 may be connected to the messenger server 200, and a user of the user terminal 100 may be able to chat with other users through a chatting room on an instant message service provided by the messenger server 200.

The user terminal 100 may receive a content recommendation from the messenger server 200 through the chatting room. The user terminal 100 may be a wireless communication device such as a desktop, a laptop computer, a mobile communication terminal, a PDA, a smart phone, a tablet, a smart TV, and the like.

The messenger server 200 is a computer device connected to the user terminal 100 over a network, and the messenger server 200 may be a server 200 provided with a memory and a processor therein to provide an instant message service to the user.

The messenger server 200 of the present disclosure may provide the instant message service to the user, and the user may chat with other users through the chatting room provided by the messenger server 200.

In the content recommendation system, the messenger server 200 may receive text information from the user terminal and provide at least one keyword-related content based on the text information. In this case, the messenger server 200 may provide the user terminal 100 with a preview content for one of the at least keyword-related content. Specifically, the messenger server 200 may replace the preview content in response to receiving interaction information of the user and provide a replacement preview content to the user terminal 100.

Here, the content may include a character image such as an emoticon and a sticker used by the user in the chatting room.

Hereinafter, an example of a content recommendation method implemented by the user terminal 100 of the present disclosure to will be described.

Figure 2:
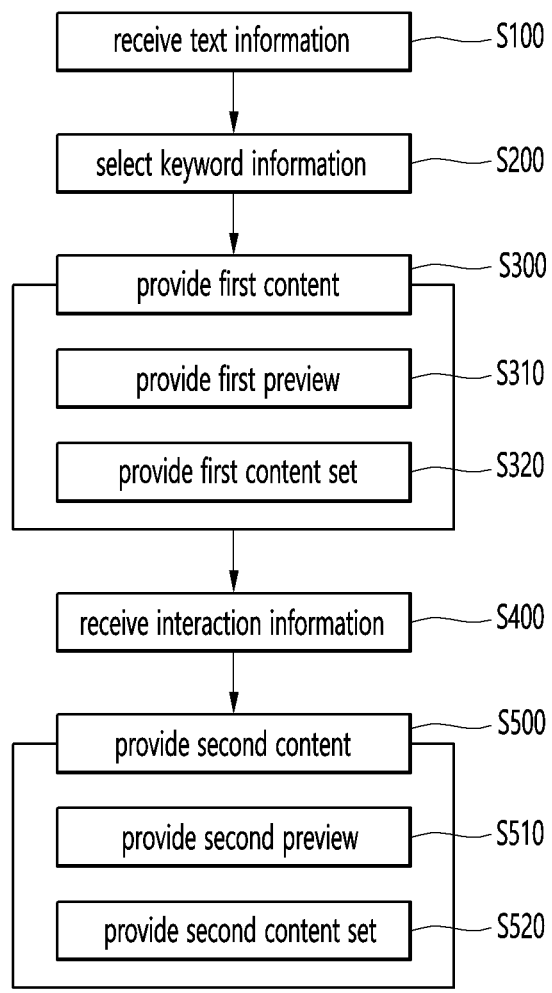
FIG. 2 is a diagram for explaining an example of a content recommendation method implemented by a user terminal shown in FIG. 1.

FIG. 2 is a diagram for explaining an example of a content recommendation method implemented by the user terminal 100 shown in FIG. 1, and FIGS. 3 to 8 are diagrams for explaining a first embodiment of the content recommendation method of the present disclosure shown in FIG. 2.

As shown in FIG. 2, the content recommendation method implemented by the user terminal 100 according to an exemplary embodiment of the present disclosure may include receiving text information in operation S100, selecting keyword information to be mapped to the text information in operation S200, outputting a first content in operation S300, receiving an interaction in operation S400, and outputting a second content in operation S500.

An example in which operations S100 to S500 are sequentially performed is illustrated in FIG. 2, but the present disclosure is not necessarily limited thereto.

Hereinafter, a content recommendation method implemented by the user terminal 100 when text information is mapped to one item of keyword information will be described as a first embodiment, and a content recommendation method implemented by the user terminal 100 when text information is mapped to a plurality of items of keyword information will be described as a second embodiment.

Hereinafter, according to an example shown in FIG. 2, the first embodiment of the content recommendation method of the present disclosure will be described for convenience of description.

Hereinafter, operation S100 of receiving the text information will be described with reference to FIG. 3.

In operation S100, the user terminal 100 may receive the text information from a user participating in a chatting room through a text input window of the chatting room.

Figure 3:
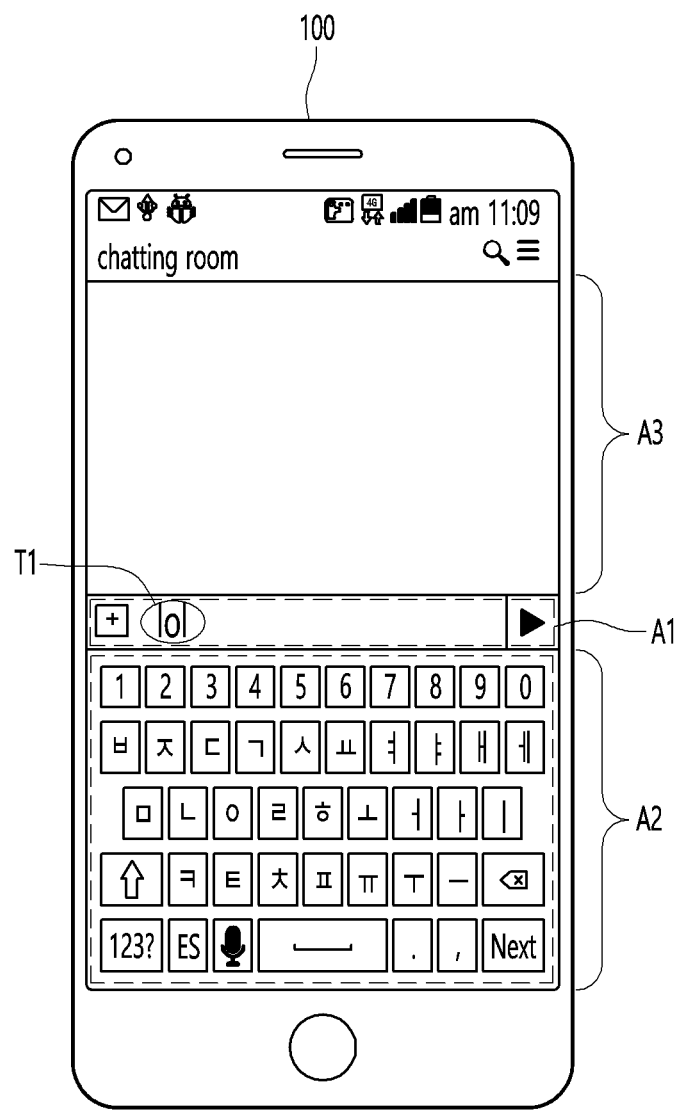

For example, in a case where the user wishes to input a text in the chatting room, as shown in FIG. 3, as a chatting room region A3 is reduced, a text input window A1 may come upward and a keyboard region A2 may be displayed under the text input window A1.

As shown in FIG. 3, in a state where the chatting room is displayed in the user terminal 100, the user terminal 100 may receive a first text T1 from the user in the text input window A1 of the chatting window through a keyboard interface displayed in the keyboard region A2.

Hereinafter, operation S200 of selecting the keyword information to be mapped to the text information will be described with reference to FIG. 4. In operation S200, the user terminal 100 may map at least one item of keyword information corresponding to the text information. An example in which, as the keyword information corresponding to one item of text information T1, there is only one item of keyword information, i.e. first keyword information K1, is illustrated in FIGS. 4 to 8.

To this end, at least one item of keyword information according to text information may be pre-stored in the user terminal 100.

For example, the user terminal 100 may be in advance provided with a keyword mapping table for mapping each item of text information with keyword information. The keyword mapping table may be simultaneously stored in the messenger server and the user terminal and may be periodically synchronized.

Figure 4:
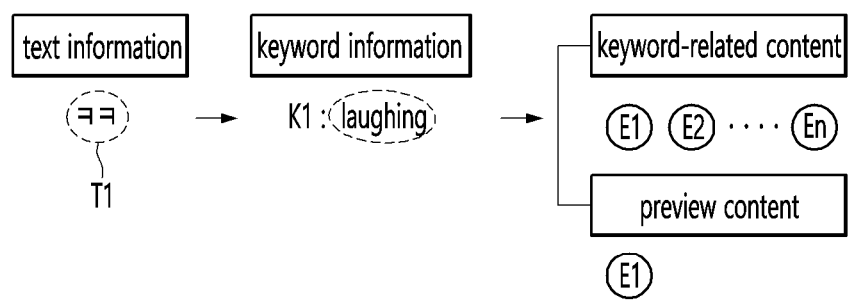

Accordingly, as shown in FIG. 4, the user terminal 100 may map information on the first text T1 to the first keyword information K1 according to the keyword mapping table.

Then, the user terminal 100 may transmit the keyword information to the messenger server 200. For example, the the messenger server 200 may receive the first keyword information K1 shown in FIG. 4 from the user terminal 100.

Then, the messenger server 200 may select at least one content related to the keyword information from the keyword information. To this end, a content mapping table for mapping keyword information and at least one keyword-related content may be pre-stored in the messenger server 200.

Accordingly, as shown in FIG. 4, for example, when the first keyword information K1 is received from the user terminal 100, the messenger server 200 may select contents E1, E2, . . . , and En to be mapped to the first keyword information K1 from among a plurality of emoticon contents stored in the messenger server 200 according to the content mapping table as keyword-related contents.

The messenger server 200 may bundle at least a part of the selected keyword-related contents into one content group and provide the content group to the user terminal 100. This will be described in more detail with reference to FIG. 5 below.

The messenger server 200 may provide a first preview content for the first content while providing the user terminal 100 with the keyword-related contents. Here, the first content may be any one of the keyword-related contents provided by the messenger server 200 to the user terminal 100.

The messenger server 200 may select a first content E1 from among the keyword-related contents provided to the user terminal 100 as shown in FIG. 4.

Here, the messenger server 200 may select the first content from among the keyword-related contents provided by the user terminal 100 based on at least one of the following: (1) a usage frequency in the user terminal 100, (2) a usage frequency in a user terminal different from the user terminal 100, and (3) a server registration date of the content.

That is, from among the keyword-related contents provided to the user terminal 100, the messenger server 200 may select, as a first preview content, (1) a content most frequently used by a user who has transmitted keyword information, (2) a content most frequently used by another user who transmitted keyword information, or (3) a content with the latest date of registration in the messenger server.

Selection of the first content from among the keyword-related contents provided to the user terminal 100 may be performed in a manner different from that described above. While providing information on a first content group to the user terminal 100, the messenger server 200 may provide thumbnail contents and preview contents of all contents included in the first content group. In addition, the user terminal 100 may select any one of the contents in the first keyword group provided from the messenger server 200 as the first content.

Hereinafter, with reference to FIG. 5, designating keyword-related contents selected by the messenger server 200 as a first content group and a first content set will be described.

The messenger server 200 may provide at least a part of the selected keyword-related contents to the user terminal 100. The messenger server 200 may bundle a predetermined number of keyword-related contents into one content group and provide the content group to the user terminal 100.

Figure 5:
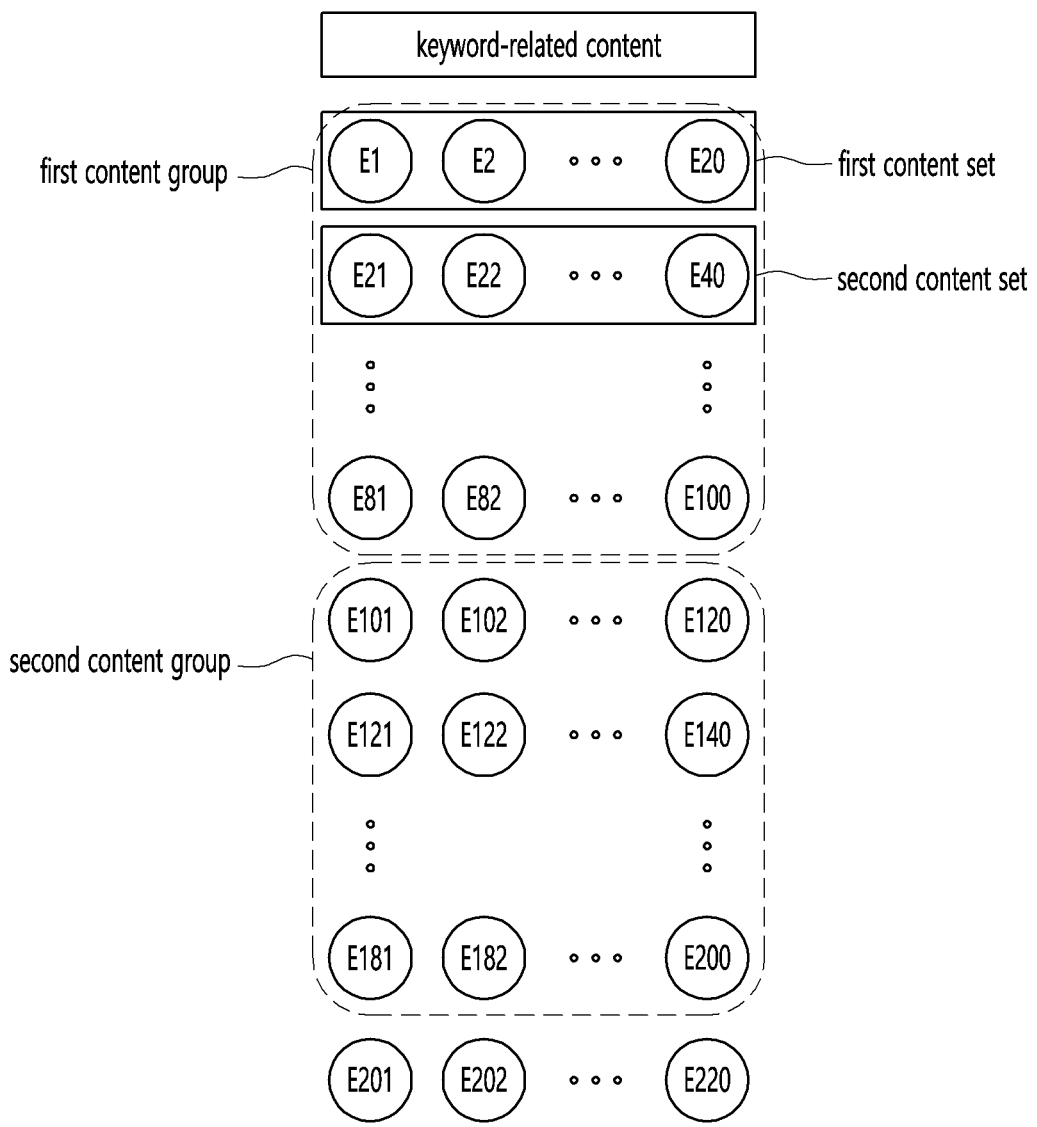

As shown in FIG. 5, for example, when the number of keyword-related contents selected by the messenger server 200 is 220 and a predetermined number of contents to be provided to the user terminal 100 at once is 100, the messenger server 200 may select 100 out of the 220 keyword-related contents and designate the 100 keyword-related contents as a first content group.

The messenger server 200 may first provide the first content group to the user terminal 100. In addition, the user terminal 100 may bundle a predetermined number of contents among the contents in the first content group into one content set and output the corresponding content set.

As shown in FIG. 5, for example, when the predetermined number of contents included in one content set is 20, the user terminal 100 may select 20 out of the 100 contents and designate the selected contents as a first content set. While details thereof will be described later with reference to FIG. 6, the user terminal 100 may output the contents in the first content set in operation S300 of outputting the first content. The contents in the first content set may be output in operation S300 of outputting the first content. In addition, the user terminal 100 may select 20 out of the remaining 80 contents other than 20 contents designated as the first content set in the 100 contents and designate the selected contents as a second content set. While details thereof will be described later with reference to FIG. 9, the user terminal 100 may output the contents in the second content set in operation S500 of outputting the second content.

FIG. 5 illustrates that the contents are respectively given unique numbers and the first and second content sets are designated according to the order of the unique numbers of the contents, but the present disclosure is not limited thereto. In fact, the contents may not be given the unique numbers as shown in FIG. 5. In addition, the user terminal 100 may select contents, which are to be included in the first content set and the second content set, randomly or by a predetermined criterion regardless of the order of the unique numbers of the contents.

As such, there may be some cases where the user terminal 100 outputs more than the predetermined number of contents while outputting the contents included in the first content group. Specifically, if the predetermined number is 100, it means that the user terminal 100 outputs all the contents included in the first content group. If the predetermined number is 95, it means that the user terminal 100 outputs only 95 contents included in the first content group, but 5 contents are not output.

When such cases happen, the user terminal 100 may receive additional keyword-related contents from the messenger server 200. The messenger server 200 may reselect 100 contents out of the remaining contents other than the 100 contents already selected as the first content group and provided to the user terminal 100 in the keyword-related contents, and may designate the reselected 100 contents as a second content group.

The messenger server 200 may additionally provide the second content group to the user terminal 100. In addition, the user terminal 100 may bundle a predetermined number of contents among the contents in the second content group into one content set and output the corresponding content set.

Hereinafter, the operation S300 of outputting the first content will be described with reference to FIG. 6.

The operation S300 of outputting the first content may include outputting a first content set in operation S310 and outputting a first preview content in operation S320, and these two operations may be simultaneously performed.

Figure 6:
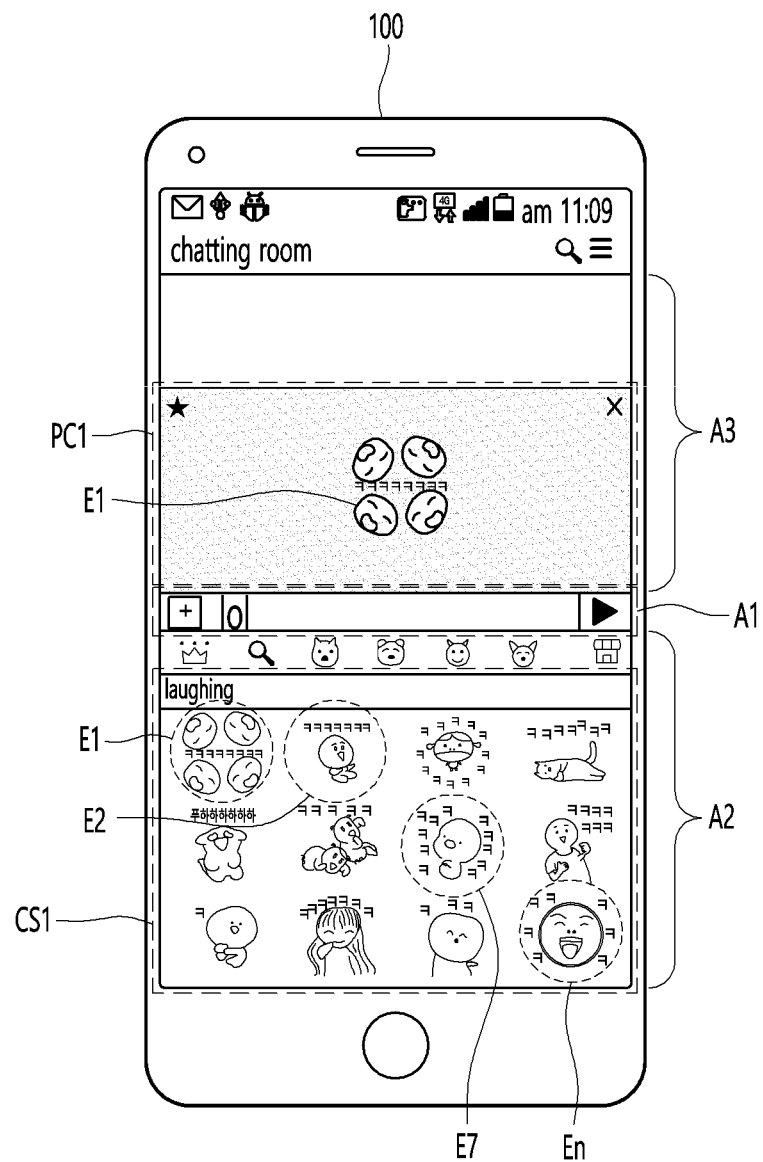

FIG. 6 illustrates an example in which a first content E1 is selected and provided as a first preview content PC1 in operation S300 of outputting the first content. The first content E1 is selected from among contents included in a first content set CS1.

In operation S310 of outputting the first content set, the user terminal 100 may select a predetermined number of contents from among the contents in the first content group provided from the messenger server 200 as the first content set CS1. Referring to FIG. 5, the user terminal 100 may output keyword-related contents E1, E2, . . . , and En in the first content set CS1.

Here, the first content set CS1 may be output in a form in which thumbnail contents of the contents in the first content set CS1 are arranged at a predetermined interval. FIG. 6 illustrates that the thumbnail contents are arranged in three rows and four columns, but the present disclosure is not limited thereto.

Here, the user terminal 100 may output at least one keyword-related content E1, E2, . . . , or En included in the first content set CS1 to be sequentially arranged according to ranking based on popularity. However, the present disclosure is not necessarily limited thereto.

In operation S320 of outputting the first preview, the user terminal 100 may output the first preview content PC1 of the first content E1 provided from the messenger server 200. The first content set CS1 and the first preview content PC1 may be simultaneously output by the user terminal 100.

When providing the first content set CS1 and the first preview content PC1 to the chatting room in which the user is participating, the user terminal 100 may display the first content set CS1 and the first preview content PC1 to be overlaid on some regions of the chatting room.

That is, as shown in FIG. 6, the text input window A1 of the chatting room, the first content set CS1, and the first preview content PC1 may be displayed to be overlaid on some regions of the chatting room.

Here, the first preview content PC1 may be located above the text input window A1 to be overlaid on the chatting room region A3, and the first content set CS1 may be displayed in the keyboard region A2 under the text input window A1.

Hereinafter, operation S400 of receiving the interaction will be described with reference to FIGS. 7A-7B.

In operation S400 of receiving the interaction, the user terminal 100 may receive the interaction from the user.

The interaction may be any of various predetermined input operations of the user. For example, as shown in FIG. 7A, the user terminal 100 may receive a pull to action performed by the user on a display region of the first content set CS1 as an interaction.

Here, the pull to action may refer to an operation in which the user touches the display region of the first content set CS1 with a finger and then pulls and releases the display region in a specific direction. For example, as shown in FIG. 7A, the pull to action may be performed by the user's touching the display region of the first content set CS1 in a downward direction as indicated by an arrow and then pulling and releasing the display region.

In addition, as shown in FIG. 7B, the user terminal 100 may receive an input of clicking a random button RB provided in the user terminal 100 as an interaction. The random button RB may be a touch button that the user terminal 100 outputs to a display unit.

Various methods for an interaction may be determined according to a user's selection, a service provider's selection, or a function supported by an operating system of the user terminal 100.

Hereinafter, operation S500 of outputting the second content will be described with reference to FIG. 8.

In operation S500 of outputting the second content, the user terminal 100 may output a second preview content together in operation S510 while outputting a second content set in operation S520.

Operation S500 of outputting the second content may be performed in response to the interaction described above.

In operation S500 of outputting the second content, the user terminal 100 may select, as a second content set CS2, a predetermined number of contents from among the remaining contents other than the contents designated as the first content set SC1 in the contents of the first content group provided from the messenger server 200, as shown in FIG. 5. Therefore, the first content set CS1 and the second content set CS2 may include different contents.

In operation S510 of outputting the second content set, the second content set CS2 may be output to replace the first content set CS1. Specifically, as shown in FIG. 8, the user terminal 100 may replace the first content set CS1 previously displayed in the keyboard region A2 with that the second content set CS2, so that the second content set CS2 can be displayed.

In operation S520 of outputting the second preview content, a second preview content PC2 different from the first preview content PC1 may be output. The second preview content PC2 may be output to replace the first preview content PC1.

The second preview content PC2 may be a preview content for a second content E7. The second content E7 may be a content selected from the second content set.

Hereinafter, another embodiment of operation S500 of outputting the second content will be described with reference to FIG. 9.

Figure 9:
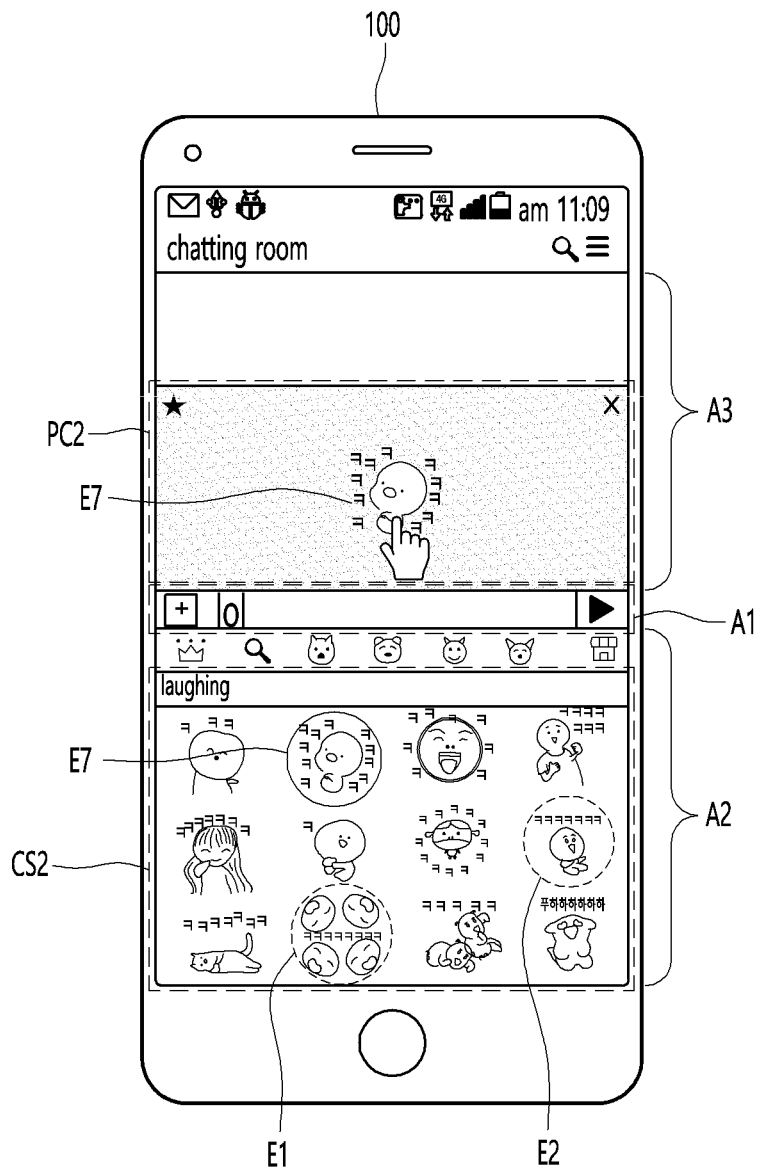

As shown in FIG. 9, the second content set CS2 may include contents which are the same as the contents included in the first content set CS1, but which are shuffled to have a different output arrangement.

For example, all of the contents included in the second content set CS2 illustrated in FIG. 9 are included in the first content set CS1. However, the second content set CS2 has an output arrangement of the contents different from that of the first content set CS1.

Although not illustrated in the drawings, the second content set CS2 may be output with the same contents as those of the first content set CS and in the same output arrangement as that of the first content set CS1. In this case, it may be seen that only operation S520 of outputting the second preview content is performed in operation S500 of outputting the second content. That is, the content set does not change, but only the preview content is replaced.

Figure 8:
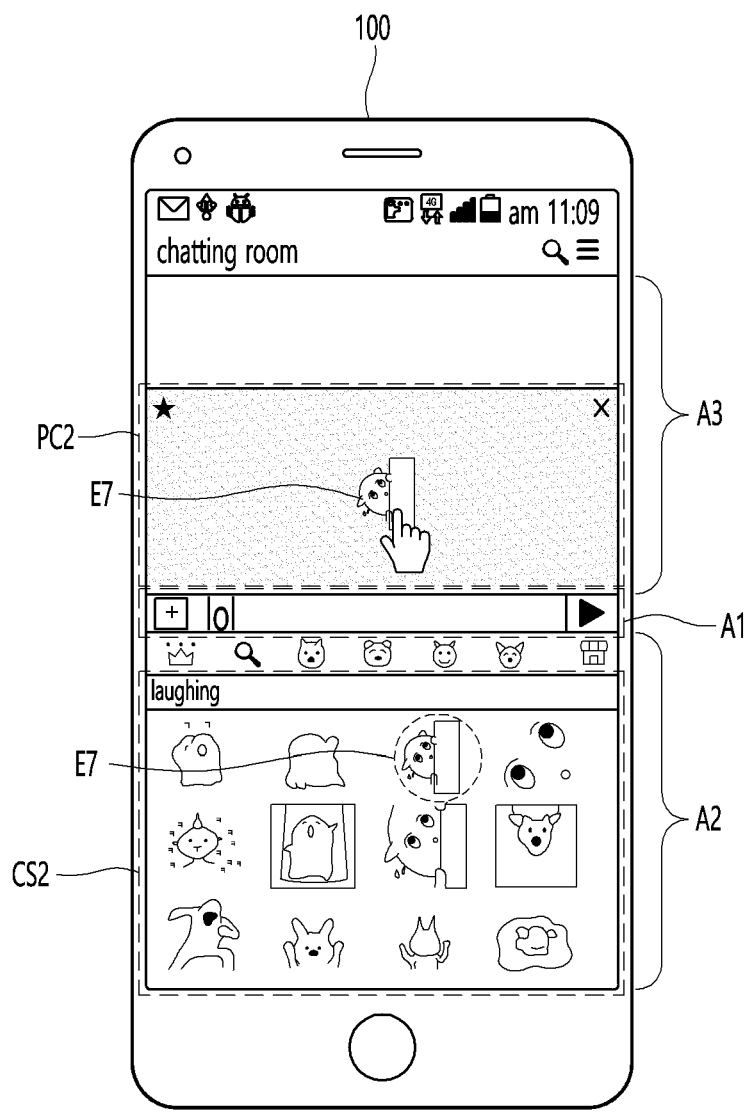

As shown in FIG. 8 or FIG. 9, after operation S500 of outputting the second content is performed, the user terminal 100 may receive information that a user selects any one of at least one keyword-related content included in the second content set CS2 and the second preview content PC2, as shown in FIG. 8 or FIG. 9. Then, the user terminal 100 may display the content selected by the user in the chatting room.

Figure 10:
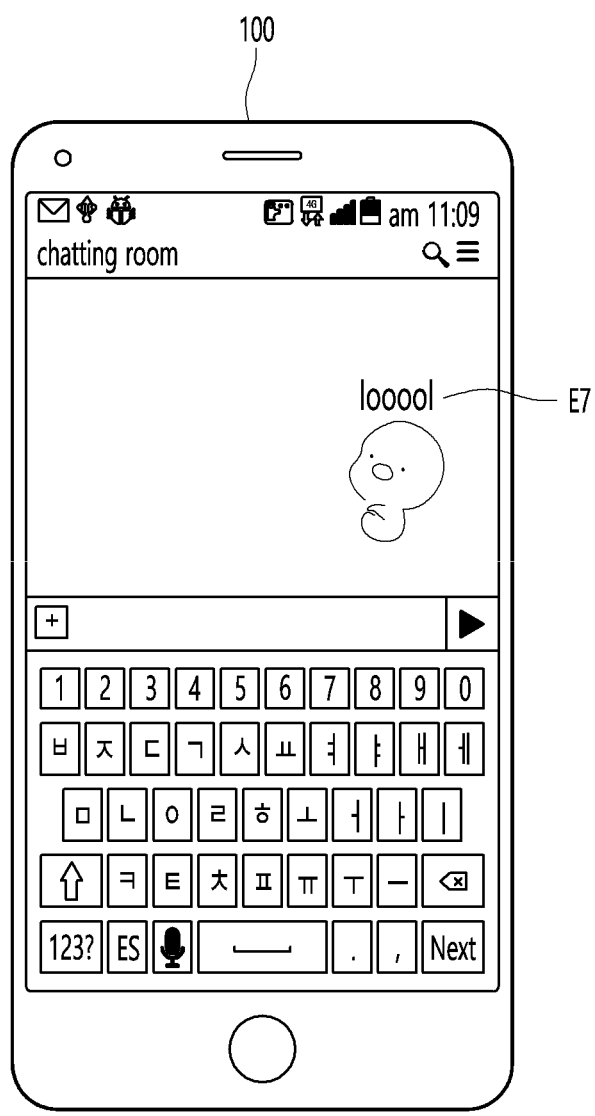

For example, when the second content E7 corresponding to the second preview content PC2 is clicked and selected by the user from each keyword-related content in the second content set CS2 and the second preview content PC2 as shown in FIG. 9, the second content E7 corresponding to the second preview content PC2 may be displayed in the chatting room as shown in FIG. 10.

As such, in the content recommendation method according to an exemplary embodiment of the present disclosure, while at least one keyword-related content for text information received from the user terminal 100 and a preview content therefor are provided, the preview content is replaced by at least one keyword-related content in response to the user's action, so that the user can enjoy a desired content more conveniently.

The content recommendation method according to the first embodiment of the present disclosure has been described with an example in which there is one item of keyword information to be mapped to text information. Hereinafter, a case in which there is a plurality of items of keyword information to be mapped to text information will be described as a second embodiment.

Figure 11:
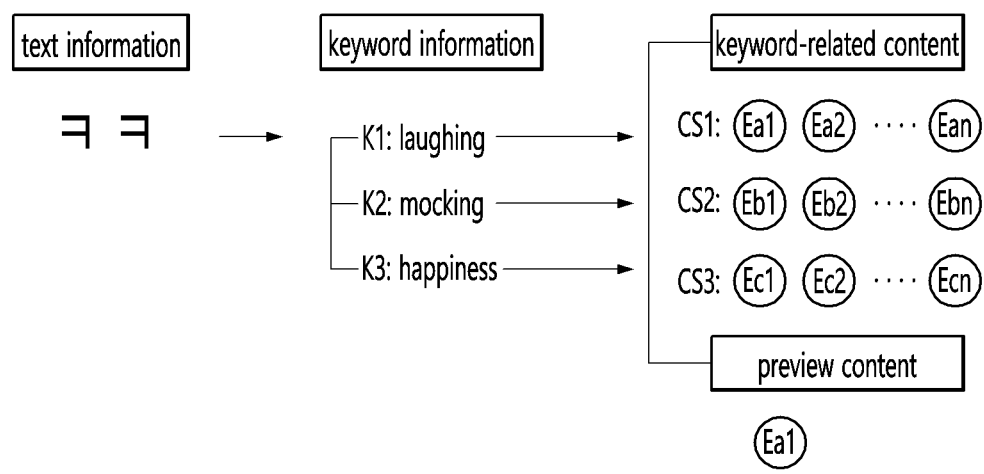
FIGS. 11 to 13 are diagrams for explaining a second embodiment of the content recommendation method of the present disclosure shown in FIG. 2.
Figure 12:
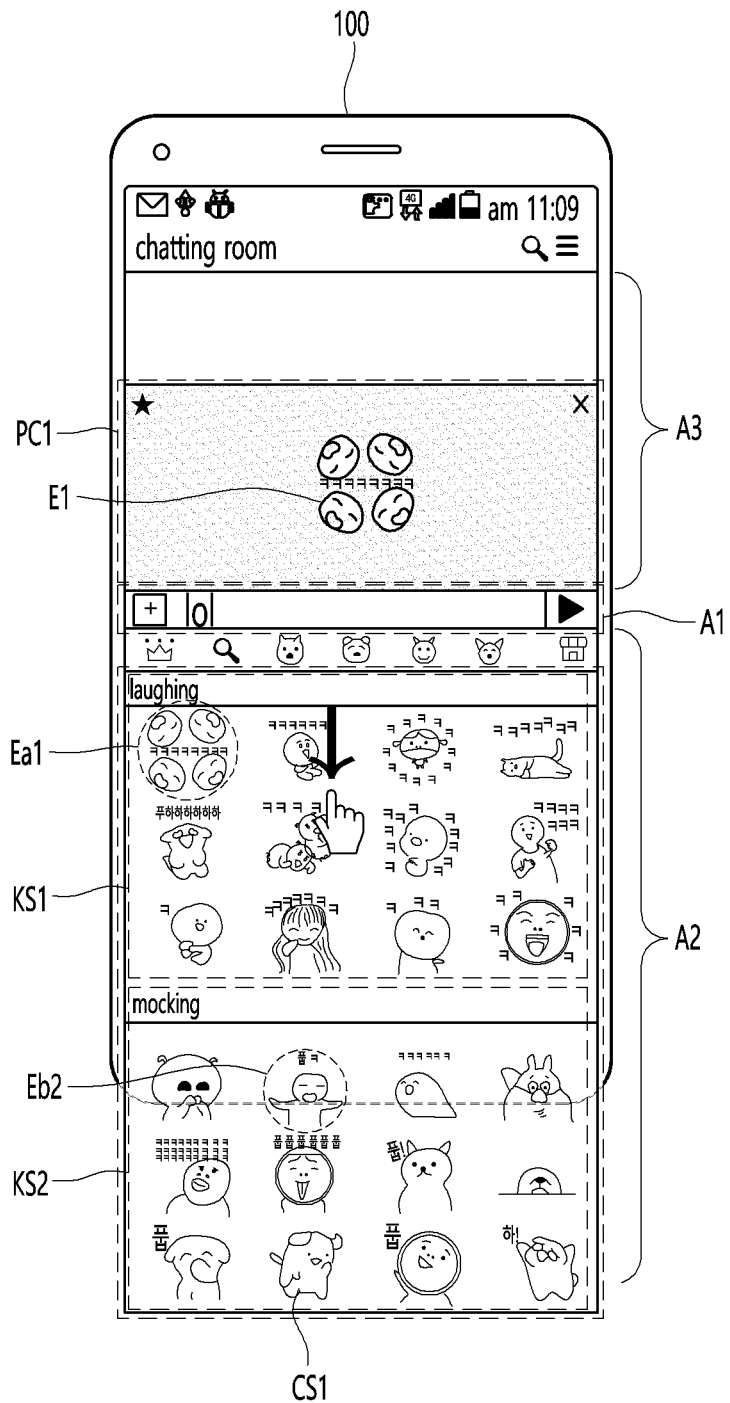
Figure 13:
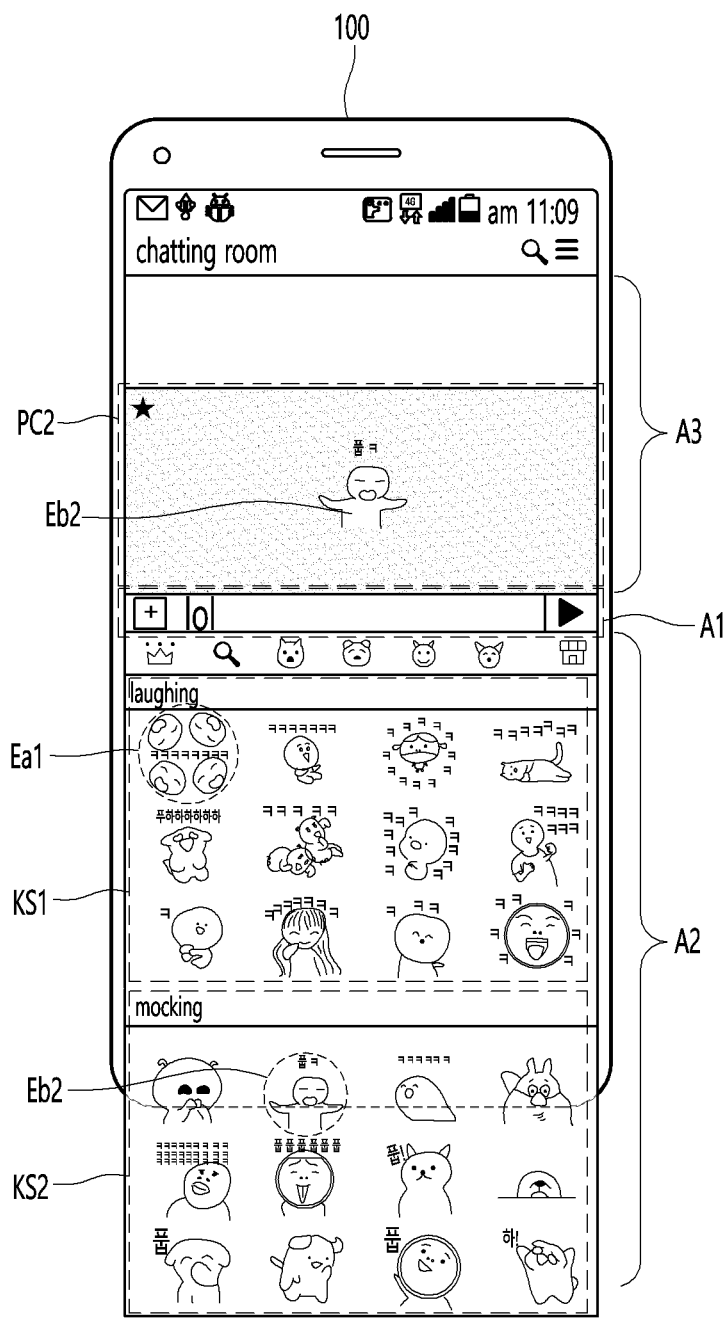
Figure 14A:
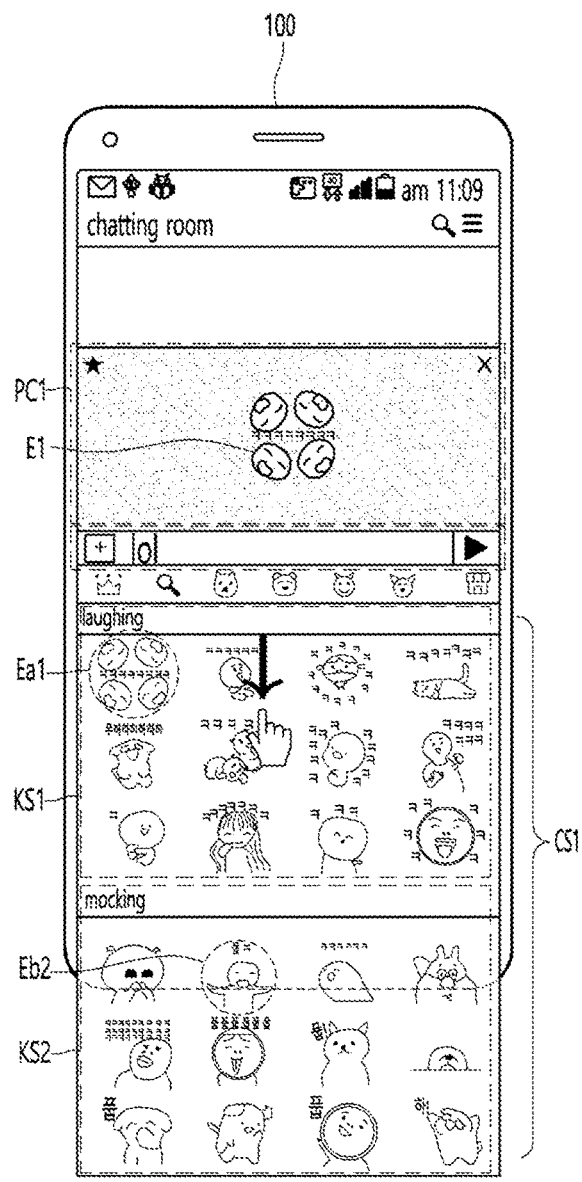
FIGS. 14A-14B are diagrams for explaining a first modified example of a content recommendation method according to the second embodiment.
Figure 14B:
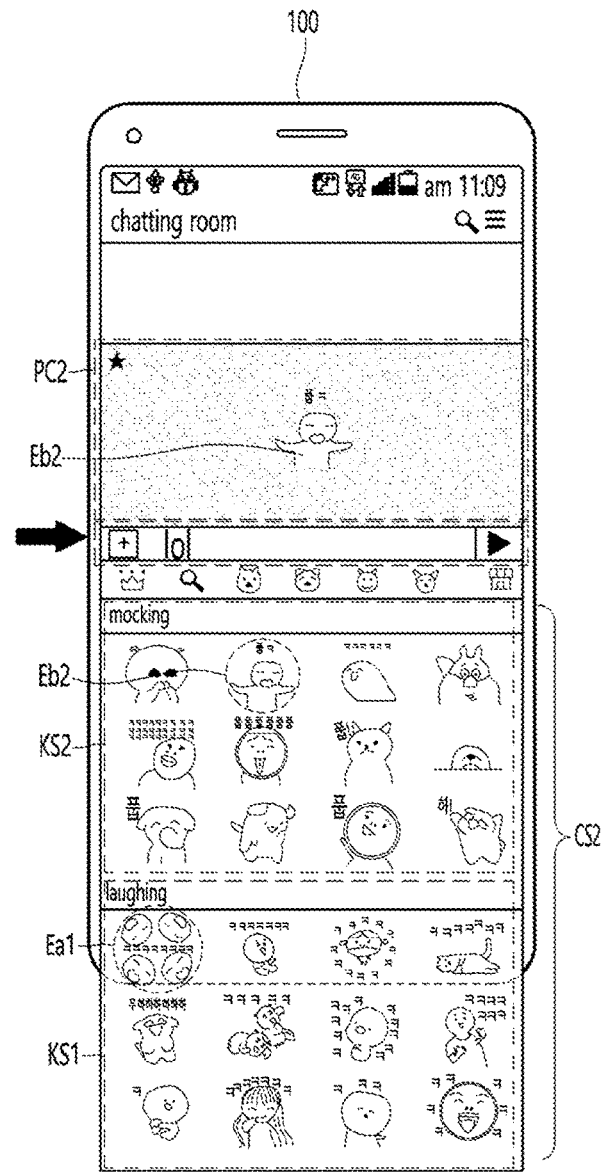
Figure 15A:
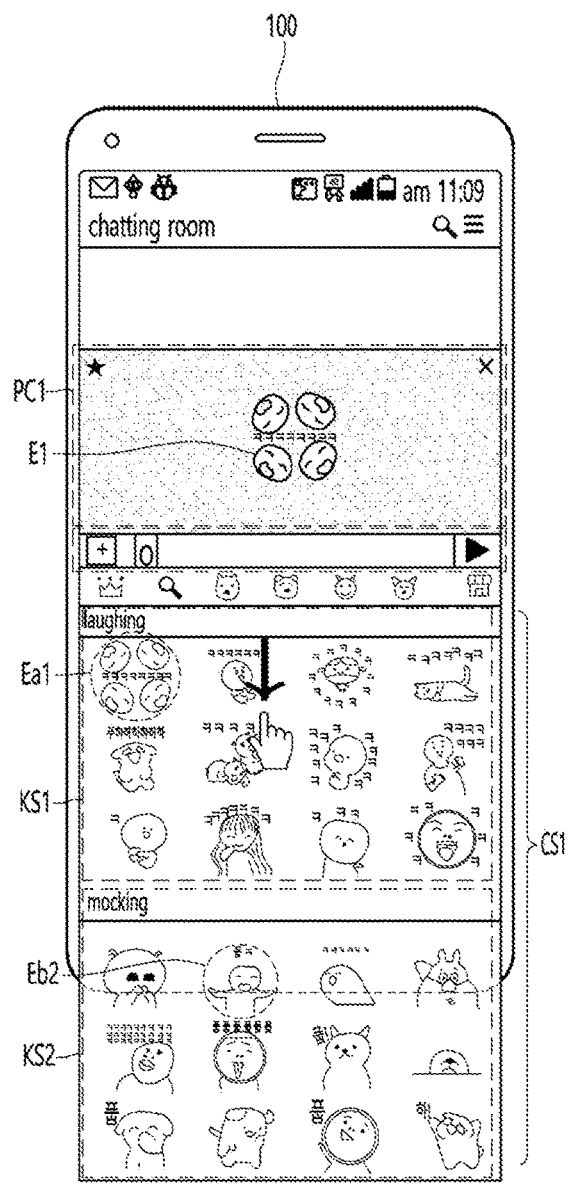
FIGS. 15A-15B are diagrams for explaining a second modified example of the content recommendation method according to the second embodiment.
Figure 15B:
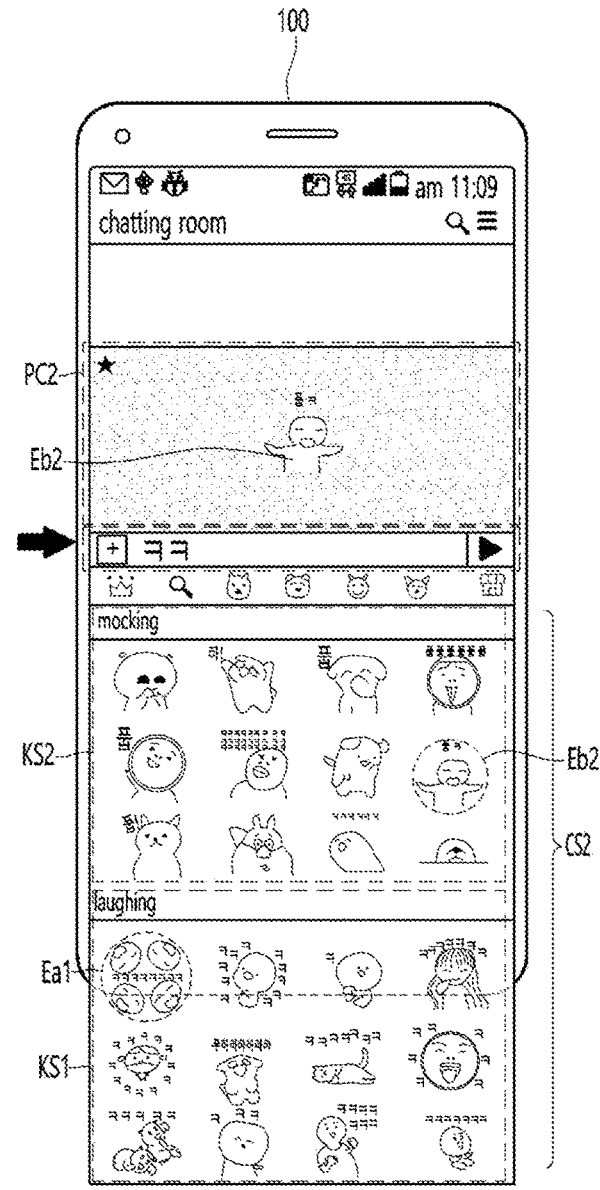

FIGS. 11 to 13 are diagrams for explaining a second embodiment of the content recommendation method of the present disclosure shown in FIG. 2. FIGS. 14A-14B are diagrams for explaining a first modified example of a content recommendation method according to the second embodiment. FIGS. 15A-15B are diagrams for explaining a second modified example of the content recommendation method according to the second embodiment.

In FIGS. 11 to 15, differences from FIGS. 1 to 10 will be mainly described while the same description as that of FIGS. 1 to 10 is omitted.

The content recommendation method according to the second embodiment of the present disclosure may include receiving text information in operation S100, selecting keyword information to be mapped to the text information in operation S200, outputting a first content in operation S300, receiving an interaction in operation S400, and outputting a second content in operation S500.

Hereinafter, operation S200 of selecting the keyword information to be mapped to the text information will be described with reference to FIG. 11. In the content recommendation method according to the second embodiment of the present disclosure, there may be a plurality of items of keyword information to be mapped to one item of text information input to the user terminal.

Here, the user terminal 100 may transmit the plurality of items of keyword information to be mapped in operation S200 to the messenger server 200. Accordingly, the messenger server 200 may receive information on each of the plurality of items of keyword information and select at least one keyword-related content for each of the plurality of items of keyword information.

For example, as shown in FIG. 11, the keyword information to be mapped to the information on the first text T1 received by the user terminal 100 may include first keyword information K1, second keyword information K2, and third keyword information K3.

In this case, the messenger server 200 may receive the first keyword information K1, the second keyword information K2, and the third keyword information K3 in operation S100 of receiving the keyword information.

The messenger server 200 may select at least one keyword-related content Ea1, Ea2, . . . , or Ean having the first keyword information K1 for the first keyword information K1 as a first keyword group KG1. In addition, the messenger server 200 may select at least one keyword-related content Eb1, Eb2, . . . , or Ebn having the second keyword information K2 for the second keyword information K2 as a second keyword group KG2. In addition, the messenger server 200 may select at least one keyword-related content Ec1, Ec2, . . . , or Ecn having the third keyword information K3 for the third keyword information K3 as a the third keyword group KG3.

Hereinafter, operation S300 of outputting the first content and operation S400 of receiving the interaction will be described with reference to FIG. 12.

Here, in operation S300 of outputting the first content, the user terminal 100 may select the first content set CS1 from the first keyword group and the second keyword group provided from the messenger server 200. The first content set CS1 may include a first keyword set KS1 and a second keyword set KS2.

A display region of the first content set CS1 in the user terminal 100 may be displayed separately by each of the plurality of items of keyword information according to a preset criterion.

For example, as shown in FIG. 12, the display region of the first content set CS1 may include a region of the first keyword set KS1 (referred to as first keyword set region) in which at least one keyword-related content having the first keyword information K1 is displayed, and a region of the second keyword set KS2 (referred to as a second keyword set region) in which at least one keyword-related content having the second keyword information K2 is displayed. The first keyword set region and the second keyword set region may be divided.

In this case, in FIG. 10, an region of the third keyword set KS3 (referred to as a third keyword set region) in which at least one keyword-related content having the third keyword information K3 needs to be displayed, but the third keyword set region is omitted in the drawings.

However, as shown in FIG. 9, when there are three items of keyword information to be mapped, three keyword set regions may be displayed in the display region of the first content set CS1. When there are two items of keyword information to be mapped, two keyword set regions may be displayed.

Thereafter, as shown in FIG. 10, when the user performs a pull to action in a direction as indicated by an arrow and the user terminal 100 receives an interaction, operation S500 of outputting the second content may be performed as shown in FIG. 11.

Hereinafter, operation S500 of outputting the second content will be described with reference to FIG. 13.

In operation S500 of outputting the second content, any one content selected from at least one keyword-related content having the second keyword information K2 different from the first keyword information K1 may be output as the second preview content PC2, as shown in FIG. 13.

For example, when a first content Ea1 in the first keyword set KS1 is provided as the first preview content PC1 in operation S300 of outputting the first content, as shown in FIG. 12, a second content Eb2 in the second keyword set KS2 may be provided as the second preview content PC2 in operation S500 of outputting the second content, as shown in FIG. 13.

However, the present disclosure is not necessarily limited thereto, and it is also possible that a content other than the content selected as the first preview content PC1 in the at least one keyword-related content is selected as the second preview content PC2.

For example, a content located at a point where the pull to action starts in the first content set CS1 of operation S300 of outputting the first content may be selected as a preview content in operation S500 of outputting the second content.

FIG. 13 illustrates an example in which, in operation S500 of outputting the second content, the second content set CS2 is provided in the same manner as the first content set CS1 provided in operation S300 of outputting the first content.

Hereinafter, a modified example in which the first content set CS1 and the second content set CS2 are displayed will be described with reference to FIGS. 14A-14B.

As shown in FIGS. 14A-14B, the first content set CS1 and the second content set CS2 may be provided in different arrangement in response to an interaction.

Specifically, as a first modified example of the second embodiment, as shown in FIGS. 14A-14B, the arrangement of the first keyword set KS1 and the second keyword set KS2 displayed in the display region of the second content set CS2 in operation S500 of outputting the second content may be different from the arrangement of the first keyword set KS1 and the second keyword set KS2 displayed in the display region of the first content set CS1 in operation S300 of outputting the first content.

More specifically, in operation S300 of outputting the first content according to the first modified example, the first keyword set KS1 may be located at the top in the region of the first content set CS1 and the second keyword set KS2 may be located under the first keyword set KS1, as shown in FIG. 4A. However, in operation S500 of outputting the second content, in the region of the second content set CS2, the second keyword set KS2 may be located at the top in the region of the second content set CS2 and the first keyword set KS1 may be located under the keyword set KS2, as shown in FIG. 14B.

As such, in the first modified example of the second embodiment of the present disclosure, a plurality of keyword sets may be provided in different arrangement depending on operation of outputting the first content and operation of outputting the second content.

Hereinafter, a modified example in which the first content set CS1 and the second content set CS2 are displayed will be described with reference to FIGS. 15A-15B.

In a second modified example of the second embodiment, as shown in FIG. 13, the arrangement of at least one keyword-related content in each region of the first and second keyword sets KS1 and KS2 in operation S500 of outputting the second content may be different from the arrangement of at least one keyword-related content in each region of the first and second keyword sets KS1 and KS2 in operation S300 of outputting the first content.

For example, at least one keyword-related content included in each of the first and second keyword sets KS1 and KS2 in operation S500 of outputting the second content, as shown in FIG. 15B, may be provided in different arrangement from that of at least one keyword-related content included in each of the first and second keyword sets KS1 and KS2 in operation S300 of outputting the first content, as shown in FIG. 15A.

So far, the content recommendation method according to the present disclosure has been described. Hereinafter, an example of the user terminal 100 implementing the content recommendation method of the present disclosure will be described.

Figure 16:
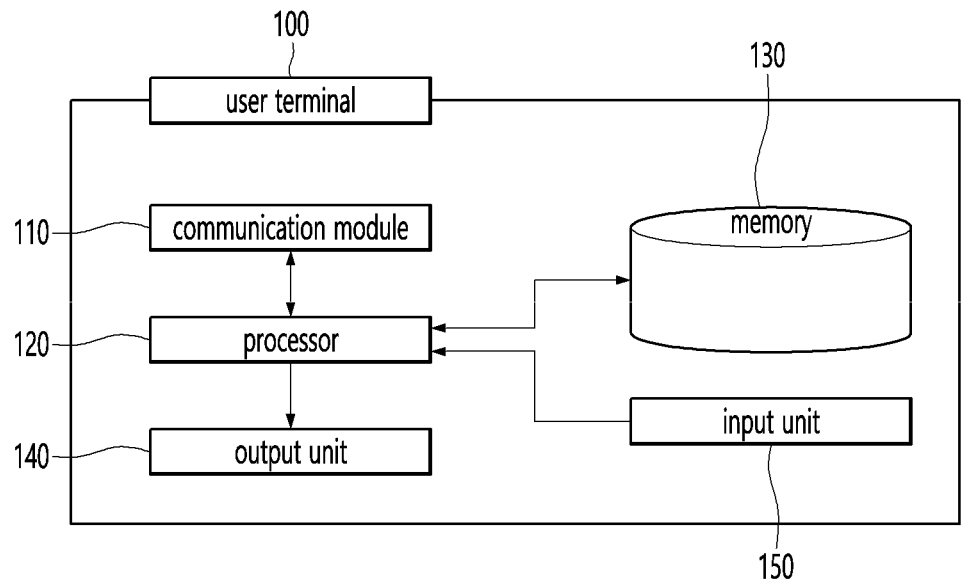
FIG. 16 is a diagram for explaining an example of a user terminal for recommending a content according to an exemplary embodiment of the present disclosure.

FIG. 16 is a diagram for explaining a configuration of the user terminal 100 according to an exemplary embodiment of the present disclosure.

Referring to FIG. 16, the user terminal 100 according to an embodiment may include a communication module 110, a processor 120, a memory 130, an output unit 140, and an input unit 150.

The communication module 110 may communicate with a server 200 in a wired/wireless manner. For example, the communication module 110 may transmit or receive various types of information, data, or signals related to provision of an instant message service and content.

The input unit 150 may receive various types of information necessary for recommendation of an instant message service and content by a user. The input unit 150 may be a touch screen module, a keyboard, a mouse, a button, a camera, a microphone, and the like.

The output unit 140 may output information necessary for providing an instant message service and content. Through the output unit 140, a screen of a chatting room related to provision of a content, first and second content sets, and first and second preview contents may be displayed.

The output unit 140 and the input unit 150 may have an inter-layered structure or may be formed integrally with each other to implement a touch screen. The touch screen may provide an input interface and an output interface between the user terminal 100 and the user.

The memory 130 may serve as a storage medium. The memory 130 may store a plurality of application programs or applications to be driven in the user terminal 100, and data and instructions for operation of the user terminal 100.

In one embodiment, information necessary for executing the provision of an instant message service and content may be stored in the form of a computer program in the memory 130.

The memory 130 may be provided as any of various hardware storage devices, such as a Read-Only Memory (ROM), a Random Access Memory (RAM), an Electrically Erasable Programmable Read-Only Memory (EEPROM), a flash drive, and a hard drive, or may be provided in the form of a web storage configured to perform a storing function of the memory 130 on the Internet.

The processor 120 may control the overall operation to execute an application related to provision of an instant message service and content.

For example, the processor 120 may execute an application related to provision of a content to perform an operation method of the user terminal 100 that recommends a content.

So far, the content recommendation method of the user terminal 100 has been described. Hereinafter, a content recommendation method of the messenger server 200 connected to the user terminal 100 over a network will be described.

Figure 17:
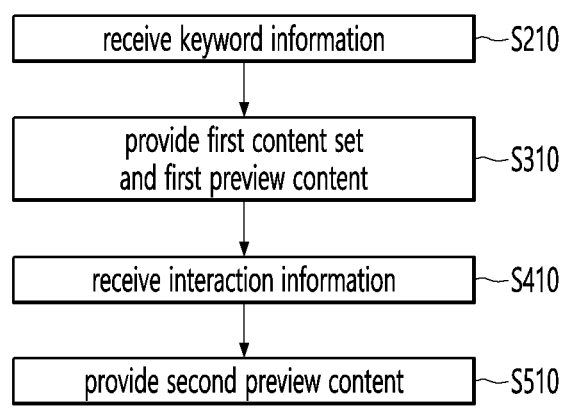
FIG. 17 is a diagram for explaining an example of the content recommendation method shown in FIG. 1 and implemented by a messenger server.

Referring to FIG. 17, the content recommendation method implemented by the messenger server 200 may include receiving keyword information in operation S210, providing a first content set and a first preview content in operation S310, receiving interaction information in operation S410, and providing a second preview content in operation S510.

Here, an example in which the respective operations are performed sequentially is illustrated in FIG. 17, but the present disclosure is not necessarily limited thereto.

Operation S210 performed by the messenger server 200 may correspond to operation S200 performed by the user terminal 100. Operation S310 performed by the messenger server 200 may correspond to operation S300 performed by the user terminal 100. Operation S410 performed by the messenger server 200 may correspond to operation S400 performed by the user terminal 100. Operation S510 performed by the messenger server 200 may correspond to operation S500 performed by the user terminal 100.

Therefore, in describing each operation performed by the messenger server 200, any redundant description related to an operation performed by the user terminal 100 will be omitted.

In operation S210 of receiving the keyword information, the messenger server 200 providing an instant message through a chatting room may receive the keyword information from a user terminal of a user who is participating in the chatting room.

In operation S310 of providing the first content group and the first preview content, the messenger server 200 may provide the user terminal 100 with a first content group including at least a part of contents related to the keyword information and the first preview content for a first content included in the first content group.

In operation S410 of receiving the interaction information, the messenger server 200 may receive the interaction information from the user terminal.

In operation S510 of providing the second preview content, the messenger server 200 may provide the user terminal with the second preview content for a second content in response to the interaction information. Here, the second content may be a content related to the keyword information.

When the first content set is not replaced in the user terminal 100 in response to the interaction information, the second content may be included in the first content set.

However, in some cases, in operation S510 of providing the second preview content, the messenger server 200 may provide the user terminal with the second content group together in response to the interaction information. Here, the second content group may include at least a part of contents related to the keyword information. Here, the second content is included in the second content group.

Hereinafter, an example of the server 200 implementing the content recommendation method of the present disclosure will be described with reference to FIG. 18.

Figure 18:
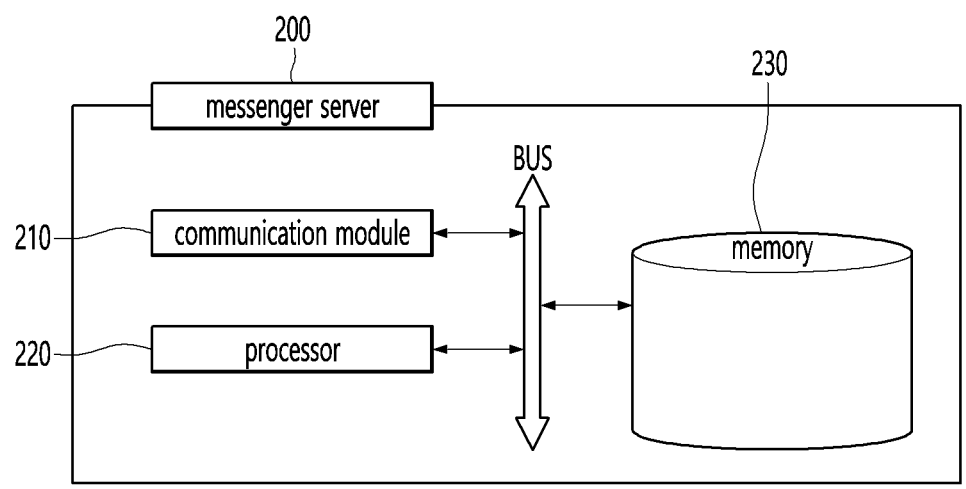
FIG. 18 is a diagram for explaining an example of a content recommendation server according to an exemplary embodiment of the present disclosure.

FIG. 18 is a diagram for explaining an example of the content recommendation server 200 according to an exemplary embodiment of the present disclosure.

The content recommendation method according to an exemplary embodiment of the present disclosure may be implemented by the messenger server 200 that provides an instant message service to a user.

As shown in FIG. 18, the messenger server 200 implementing the content recommendation method according to an exemplary embodiment of the present disclosure may include a communication module 210, a processor 220, and a memory 230. The communication module 210, the processor 220, and the memory 230 may transmit or receive information to and from each other through a bus.

The communication module 210 may communicate with the user terminal 100 over a network.

The memory 230 may be in the form of a storage medium such as a hard disk, a solid state drive (SSD), a Read-Only Memory (ROM), and a Random Access Memory (RAM). The memory 230 may store a content mapping table for mapping keyword information and a content.

The processor 220 may provide an instant message service and may be configured to execute instructions included in a memory in the form of hardware such as a CPU chip.

The processor 220 may receive keyword information from the user terminal 100 of the user participating in the chatting room, as shown in FIGS. 2 and 4.

Then, the processor 220 may select at least one keyword-related content having keyword information as shown in FIGS. 2 and 4.

Then, as shown in FIGS. 2 and 5, the processor 220 may provide the user terminal 100 with a first content group including at least one keyword-related content and may provide the user terminal 100 with any one content selected from the at least one keyword-related content as a first preview content PC1.

Then, as shown in FIGS. 2 and 6, the processor 220 may receive action information regarding replacement of the first preview content PC1 from the user terminal 100.

Then, as shown in FIGS. 2 and 7, in response to the action information, the processor 220 may provide the user terminal 100 with any one content selected from the at least one keyword-related content other than the first preview content PC1 as a second preview content PC2.

As such, while providing at least one keyword-related content for text information received from the user terminal 100 and a preview content therefor, the content recommendation server 200 according to an exemplary embodiment of the present disclosure may replace the preview content with any one of at least one keyword-related content in response to a user's action, so that the user can enjoy a desired content more conveniently.

In the content recommendation method and the content recommendation server according to an exemplary embodiment of the present disclosure, while at least one keyword-related content for text information received from a user terminal and a preview content therefor are provided, the preview content may be replaced with any one of at least one keyword-related content in response to a user's action, so that the user can enjoy a desired content more conveniently.

The embodiments described above may be implemented using hardware components, software components, or a combination thereof. The method according to the above-described embodiments may be recorded in a computer-readable media that includes program instructions to be implemented by a computer to cause a processor to execute or perform the program instructions.

The technical features disclosed in each embodiment of the present disclosure are not limited only to a corresponding embodiment. Unless mutually incompatible, the technical features disclosed in each embodiment may be combined and applied to a different embodiment.

Therefore, technical features are mainly described in a corresponding embodiment; however, unless mutually incompatible, the technical features may be combined and applied to a different embodiment.

The present disclosure is not limited to the above-described embodiments and the accompanying drawings, and various modified examples and changes may be made in view of a person skilled in the art to which the present disclosure pertains. Therefore, the scope of the present disclosure should be determined by the scope of the appended claims, and equivalents thereof.

What is claimed is:

1. A content recommendation method comprising:
receiving, by a user terminal, text information through a text input window of a chatting room;
displaying, by the user terminal, a first content set in a first area of the chatting room, the first content set comprising at least a part of contents related to keyword information mapped to the text information, wherein the keyword information includes a first keyword information, and the at least a part of contents related to the keyword information comprise at least one keyword-related content associated with the first keyword information;
displaying, by the user terminal, a first preview content in a second area of the chatting room, separate from the first area, wherein the first preview content corresponds to a first content included in the first content set;
receiving, by the user terminal, an interaction with the user terminal as input to the user terminal; and
in response to the interaction, replacing, by the user terminal, the first preview content with a second preview content corresponding to a second content, wherein the second content is a content related to the keyword information mapped to the text information, wherein the keyword information further includes a second keyword information, and the content related to the keyword information comprises a content associated with the second keyword information,
wherein the first keyword information and the second keyword information are distinct from each other, and wherein each of the first keyword information and the second keyword information maps to corresponding content by way of a keyword mapping information table.

2. The content recommendation method of claim 1, further comprising:
selecting, by the user terminal, the keyword information to be mapped to the text information.

3. The content recommendation method of claim 1, wherein the second content is included in the first content set.

4. The content recommendation method of claim 1, further comprising:
in response to the interaction, varying, by the user terminal, arrangement of the contents included in the first content set to output the first content set.

5. The content recommendation method of claim 1, wherein, in the replacing, by the user terminal, the first preview content with the second preview content, the user terminal outputs a second content set different from the first content set to replace the first content set, and the second content set comprises at least a part of the contents related to the keyword information.

6. The content recommendation method of claim 5, wherein the second content is included in the second content set.

7. The content recommendation method of claim 5, further comprising:
receiving, by the user terminal, the contents related to the keyword information from a server prior to the receiving of the interaction;
selecting, by the user terminal, the part of the contents related to the keyword information as the first content set; and
selecting, by the user terminal, another part of the contents related to the keyword information as the second content set.

8. The content recommendation method of claim 7, further comprising:

when the user terminal outputs more than a predetermined number of contents related to the keyword information received in the receiving of the contents, receiving, by the user terminal, a content related to additional keyword information from the server.

9. The content recommendation method of claim 1, wherein:
the first content is related to the first keyword information, and
the second content is related to the second keyword information.

10. The content recommendation method of claim 9, wherein:
the first content set comprises a first keyword set related to the first keyword information and a second keyword set related to the second keyword information, and
in the displaying of the first content set, the user terminal displays the first keyword set and the second keyword set distinguishably from each other.

11. The content recommendation method of claim 10, further comprising:
in response to the interaction, varying, by the user terminal, arrangement of the first keyword set and the second keyword set to output the first keyword set and the second keyword set.

12. The content recommendation method of claim 1, wherein the interaction is a pull to action for a display region in which the first content set is displayed, or selection of a button provided in the user terminal.

13. The content recommendation method of claim 1, wherein:
the text input window, the first content set, and the first preview content for the chatting room are displayed to be overlaid on some regions of the chatting room, and
the first preview content is displayed on a top of the text input window, and the first set of contents is displayed at a bottom of the text input window.

14. A content recommendation terminal comprising:
a memory;
a processor connected to the memory and configured to execute instructions stored in the memory;
an input unit configured to receive information under control of the processor; and
an output unit configured to output information under control of the processor,
wherein the processor is further configured to:
control the input unit to receive text information through a text input window of a chatting room,
control the output unit to display a first content set in a first area of the chatting room, the first content set comprising at least a part of contents related to keyword information mapped to the text information, wherein the keyword information includes a first keyword information, and the at least a part of contents related to the keyword information comprise at least one keyword-related content associated with the first keyword information,
control the output unit to display a first preview content in a second area of the chatting room, separate from the first area, wherein the first preview content corresponds to a first content included in the first content set, and
control the input unit to receive an interaction with the user terminal as input to the user terminal,
wherein, in response to the interaction, the output unit, controlled by the processor, replaces the first preview content with a second preview content corresponding to a second content, wherein the second content is a content related to the keyword
information mapped to the text information, and wherein the keyword information further includes a second keyword information, and the content related to the keyword information comprises a content associated with the second keyword information, and
wherein the first keyword information and the second keyword information are distinct from each other, and wherein each of the first keyword information and the second keyword information maps to corresponding content by way of a keyword mapping information table.

15. A content recommendation method comprising:
receiving, by a server providing an instant message through a chatting room, keyword information mapped to text information from a user terminal, which is participating in the chatting room;
providing, by the server, the user terminal with a first content group comprising at least a part of contents related to the keyword information mapped to the text information and a first preview content for a first content included in the first content group,
wherein the first content group is displayed in a first area of the chatting room and the first preview content is displayed in a second area, separate from the first area, of the chatting room;
receiving, by the server, interaction information from the user terminal; and
in response to the interaction information, providing, by the server, a second preview content for a second content to the user terminal to replace the first preview content for the first content, wherein the second content is a content related to the keyword
information mapped to the text information, wherein the keyword information further includes a second keywork information and the content related to the keywork information comprises a content associated with the second keyword information,
wherein the first keyword information and the second keyword information are distinct from each other, and wherein each of the first keyword information and the second keyword information maps to corresponding content by way of a keyword mapping information table.

16. The content method of claim 15, wherein the second content is included in the first content group.

17. The content method of claim 15, further comprising:
in response to the interaction information, providing, by the server, the user terminal with a second content group different from the first content group, wherein the second content group comprises at least a part of the contents related to the keyword information.

18. The content recommendation method of claim 17, wherein the second content is included in the second content group.

19. The content method of claim 15, wherein:
the keyword information comprises a first keyword and a second keyword, and
the first content group comprises a first keyword group related to the first keyword and a second keyword group related to the second keyword.

20. The content method of claim 15, wherein the server selects the first content from at least one content included in the first content group based on at least one of the following: a usage frequency in the user terminal, a usage frequency in a user terminal different from the user terminal, and a server registration date of the content.

* * * * *